United States Patent
Nadim et al.

(10) Patent No.: US 11,308,268 B2
(45) Date of Patent: Apr. 19, 2022

(54) SEMANTIC HEADER DETECTION USING PRE-TRAINED EMBEDDINGS

(71) Applicant: INTERNATIONAL BUSINESS MACHINES CORPORATION, Armonk, NY (US)

(72) Inventors: Hassan Nadim, San Francisco, CA (US); Joshua S. Allen, Durham, NC (US); Kyle G. Christianson, Rochester, MN (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 16/598,057

(22) Filed: Oct. 10, 2019

(65) Prior Publication Data
US 2021/0109993 A1    Apr. 15, 2021

(51) Int. Cl.
*G06F 40/177*    (2020.01)
*G06F 40/258*    (2020.01)
(Continued)

(52) U.S. Cl.
CPC .......... *G06F 40/177* (2020.01); *G06F 40/258* (2020.01); *G06V 30/412* (2022.01); *G06V 10/225* (2022.01)

(58) Field of Classification Search
CPC ............... G06F 40/177; G06F 40/258; G06K 9/00449; G06K 9/2063; G06K 9/00469
(Continued)

(56) References Cited

U.S. PATENT DOCUMENTS

| 2003/0097384 A1* | 5/2003 | Hu ..................... G06K 9/00463 715/234 |
| 2006/0288268 A1* | 12/2006 | Srinivasan ............ G06F 40/226 715/210 |

(Continued)

FOREIGN PATENT DOCUMENTS

| CN | 108830287 A | 11/2018 |
| CN | 109800434 A | 5/2019 |
| CN | 109858036 A | 6/2019 |

OTHER PUBLICATIONS

Fang, Jing, et al. "Table Header Detection and Classification." Association for the Advancement of Artificial Intelligence, 2012, pp. 599-605. (Year: 2012).*

(Continued)

*Primary Examiner* — Stephen S Hong
*Assistant Examiner* — Broderick C Anderson
(74) *Attorney, Agent, or Firm* — Alexis N. Hatzis

(57) ABSTRACT

A method, computer system, and a computer program product for detecting one or more semantic headers in one or more tabular structures by utilizing a custom pre-trained embeddings model is provided. The present invention may include receiving the custom pre-trained embeddings model. The present invention may also include computing one or more dot product values associated with the one or more tabular structures from the one or more documents based on the context of each cell associated with the one or more tabular structures in the one or more documents. The present invention may then include generating one or more similarity feature values based on the computed one or more dot product values. The present invention may further include detecting the one or more semantic headers associated with the one or more tabular structures based on the one or more similarity feature values.

17 Claims, 5 Drawing Sheets

(51) Int. Cl.
*G06V 30/412* (2022.01)
*G06V 10/22* (2022.01)

(58) Field of Classification Search
USPC .............................................................. 704/9
See application file for complete search history.

(56) References Cited

U.S. PATENT DOCUMENTS

| | | | | |
|---|---|---|---|---|
| 2008/0107338 | A1* | 5/2008 | Furmaniak | G06K 9/00469 |
| | | | | 382/176 |
| 2011/0249905 | A1* | 10/2011 | Singh | G06K 9/00449 |
| | | | | 382/225 |
| 2012/0078612 | A1* | 3/2012 | Kandekar | G06F 3/0482 |
| | | | | 704/9 |
| 2017/0132526 | A1* | 5/2017 | Cohen | G06N 5/022 |
| 2019/0034719 | A1* | 1/2019 | Bellert | G06V 10/457 |
| 2019/0065460 | A1* | 2/2019 | Xin | G06N 7/005 |
| 2019/0171704 | A1* | 6/2019 | Buisson | G06K 9/00449 |

OTHER PUBLICATIONS

Mohammadzadeh, Hadi & Gottron, Thomas & Schweiggert, Franz & Heyer, Gerhard. (2012). TitleFinder: Extracting the Headline of News Web Pages based on Cosine Similarity and Overlap Scoring Similarity. 65-72. 10.1145/2389936.2389950. (Year: 2012).*

Mell et al., "The NIST Definition of Cloud Computing", Recommendations of the National Institute of Standards and Technology, NIST Special Publication 800-145, Sep. 2011, 7 pages.

Efthymiou et al., "Matching Web Tables with Knowledge Base Entities: From Entity Lookups to Entity Embeddings", International Semantic Web Conference, ISWC 2017, Lecture Notes in Computer Science, vol. 10587, Oct. 4, 2017, pp. 260-277.

Gentile et al., "Entity Matching on Web Tables: a Table Embeddings Approach for Blocking", Poster Paper, Open Proceedings, Published in Proc. 20th International Conference on Extending Database Technology (EDBT), Mar. 21-24, 2017, pp. 510-513.

Ghasemi-Gol et al., "TabVec: Table Vectors for Classifications of Web Tables", arXiv:1802.06290v1, Feb. 17, 2018, 9 pages.

Hu et al., "Harnessing Deep Neural Networks with Logic Rules", arXiv:1603.06318v5, Mar. 26, 2019, pp. 1-20.

Disclosed Anonymously, "Recognizing Semantic Formatting Information in a Document", An IP.com Prior Art Database Technical Disclosure, IP.com No. IPCOM00025199D, Publication Date: Dec. 13, 2017, 35 pages.

Nishida et al., "Understanding the Semantic Structures of Tables with a Hybrid Deep Neural Network Architecture", Proceedings of the Thirty-First AAAI Conference on Artificial Intelligence (AAAI-17), 2017, pp. 168-174.

\* cited by examiner

SEMANTIC HEADER DETECTION USING PRE-TRAINED EMBEDDINGS

BACKGROUND

The present invention relates generally to the field of computing, and more particularly to table recognition and data classification.

Documents, such as a hypertext mark-up language (HTML) and portable document format (PDF) files, may contain valuable data within tables. In order to extract data, search and precisely answer questions from arbitrary tables, a computer system may capture the related context, such as headers, of each data cell. Generally, header cells are not annotated in tables, namely tables converted from PDF to HTML.

SUMMARY

Embodiments of the present invention disclose a method, computer system, and a computer program product for detecting one or more semantic headers in one or more tabular structures by utilizing a custom pre-trained embeddings model. The present invention may include receiving the custom pre-trained embeddings model, wherein the received custom pre-trained embeddings model provides a context associated with each term included in each cell from a plurality of cells associated with the one or more tabular structures in one or more documents. The present invention may also include computing one or more dot product values associated with the one or more tabular structures from the one or more documents based on the context of each cell from the plurality of cells associated with the one or more tabular structures in the one or more documents, wherein the one or more tabular structures in the one or more documents is identified by parsing the one or more documents. The present invention may then include generating one or more similarity feature values based on the computed one or more dot product values, wherein the computed one or more dot product values are normalized. The present invention may further include detecting the one or more semantic headers associated with the one or more tabular structures from the one or more documents based on the one or more similarity feature values.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
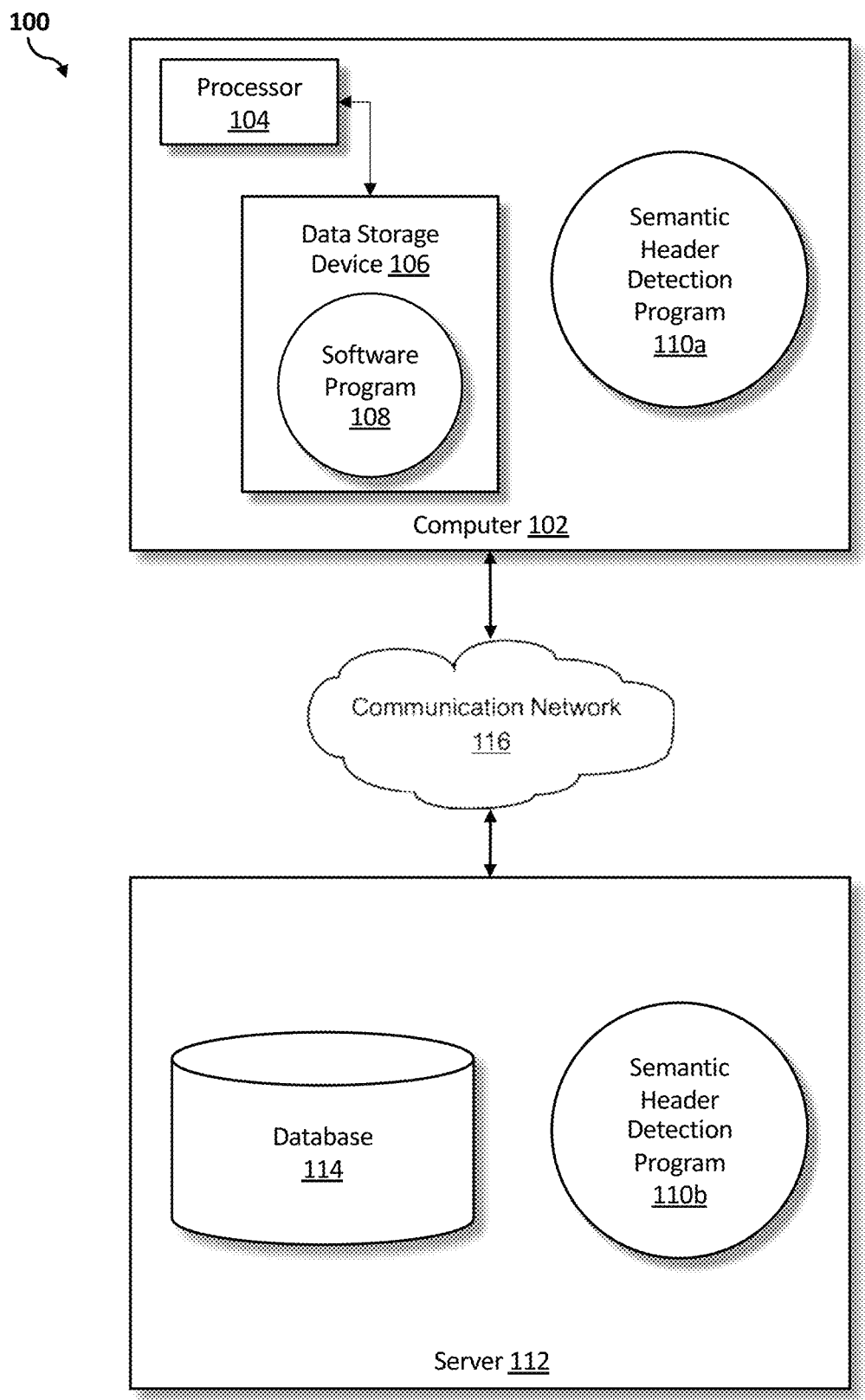
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detect at least one header in at least one tabular structure. As such, the present embodiment has the capacity to improve the technical field of table recognition and data classification by utilizing pre-trained word embeddings to detect at least one header in at least one tabular structure. More specifically, the semantic header detection program may provide a semantic understanding to computers for differentiating headers as compared to data without having to rely on syntactical features by utilizing pre-trained word embeddings.

As previously described, documents, such as a hypertext mark-up language (HTML) and portable document format (PDF) files, may include tables, which may provide a gold mine of valuable data for business domains. In order to extract data, search and precisely answer questions from arbitrary tables, a computer system may capture the related context, such as headers, of each data cell. Generally, header cells are not annotated in tables, namely tables converted from PDF to HTML. For this reason, table header detection may be problematic in the domain.

Humans may visually scan any table and easily identify the headers, even if the tables include layout errors, typographical errors, misalignment of rows and/or columns, and missing data. As such, by utilizing natural language contents of the table, computer systems may better understand the table and the corresponding contents of the table to accurately identify headers.

The valuable data included in a table may remain largely untapped due to the complexity of the artificial intelligence (AI) understanding of table structures and detecting headers within such tables. Therefore, it may be advantageous to, among other things, provide computer systems the ability to understand (or interpret) table contents from a natural language perspective for header detection. The most sophisticated natural language understanding techniques may have word embeddings. However, the semantic header detection program may utilize pre-trained word embeddings to compute features and/or values that may detect table headers. The features and/or values may also be combined with any existing machine learning (ML) model and/or combined with a heuristics-based system from header detection. Therefore, the semantic header detection program may utilize semantic understanding of the contents of a table as an effective method to detect headers in tables.

Furthermore, the semantic header detection program may provide semantic understanding to machines without relying on external knowledge-bases curated by subject-matter experts (SMEs). Therefore, embeddings may be easily trained in an unsupervised manner thereby increasing the ability of machines to quickly and efficiently understand additional data locked in billions of complex tables available on the internet and also privately owned by large enterprises.

According to at least one embodiment, the semantic header detection program may provide computers with a semantic understanding of natural language content locked inside tabular structures (e.g. tables) by detecting unmarked header cells located anywhere in the table. The present embodiment may include a semantic header detection algorithm that leverages pre-trained word embeddings to identify rows and/or columns that include header cells by computing semantic similarity between the cell contents in a table.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a semantic header detection program 110a. The networked computer environment 100 may also include a server 112 that is enabled to run a semantic header detection program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the semantic header detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the semantic header detection program 110a, 110b (respectively) to detect at least one header in at least one tabular structure. The semantic header detection method is explained in more detail below with respect to FIG. 2.

Figure 2:
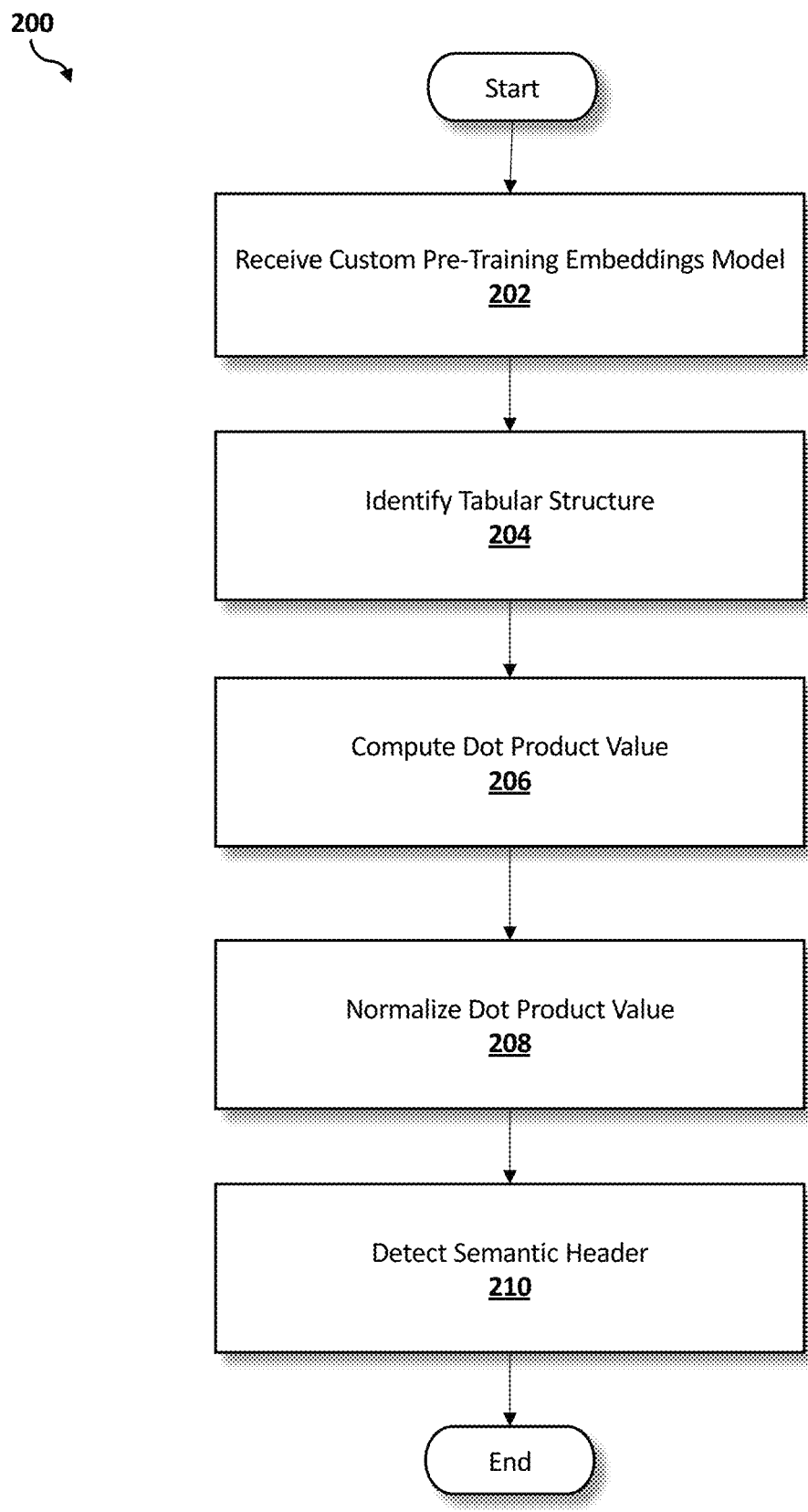
FIG. 2 is an operational flowchart illustrating a process for detecting a table header according to at least one embodiment.

Referring now to FIG. 2, an operational flowchart illustrating the exemplary table header detection process 200 used by the semantic header detection program 110a, 110b according to at least one embodiment is depicted.

At 202, a custom pre-trained embeddings model is received. Utilizing a software program 108 on the user's device (e.g., user's computer 102), a custom pre-trained embeddings model (i.e., pre-trained word embeddings model) may be received (or loaded) as input into the semantic header detection program 110a, 110b via the communication network 116. A custom pre-trained embedding model (e.g., general models like Word2Vec, GLOVE, Fasttext, or custom domain-specific models trained on proprietary data), which are pretrained using billions of words to determine the context or meaning of a given word, or a set of given words that may be included in a tabular structure.

In at least one embodiment, a user may manually select a custom pre-trained embeddings model based on the subject matter of the document that may be reviewed by the semantic header detection program 110a, 110b. In some embodiments, the semantic header detection program 110a, 110b may automatically select a custom pre-trained embeddings model based on previously utilized pre-trained embeddings model.

For example, the Word2Vec pre-trained word embedding model is loaded into the semantic header detection program 110a, 110b.

Next, at 204, a tabular structure is identified. Then semantic header detection program 110a, 110b may utilize an external engine to automatically parse through a document (e.g., article, publication, blog, report, manual) to identify a tabular structure within the document. The semantic header detection program 110a, 110b may be automatically notified by the external engine when a tabular structure within the document is identified. The identified tabular structure may then be transmitted as an input into the semantic header detection program 110a, 110b via the communications network 116.

In at least one embodiment, the semantic header detection program 110a, 110b may utilize human intervention (e.g., user) to manually confirm whether to proceed with the identified tabular structure. For example, if the user reviews the identified tabular structure and determines that identified tabular structure includes little or no value to the document, then the user will indicate that the semantic header detection program 110a, 110b should ignore the identified tabular structure. In one embodiment, once a tabular structure is identified, a user is notified (e.g., via a dialog box). The external engine may pause until the user confirms notification of the identified tabular structure. In at least one other embodiment, the external engine may present a list of each of the tabular structures identified in the entire document to the user (e.g., via a dialog box). The list may include the page(s) where the tabular structure is located on in the document. Then, the user may click on the page(s) associated with the identified tabular structure (e.g., via a hyperlink) to review each identified tabular structure.

In at least one embodiment, when multiple tabular structures are identified, then the external engine may transmit each tabular structures, separately or collectively. The semantic header detection program 110a, 110b may then proceed with each tabular structure simultaneously. In at least one other embodiment, the semantic header detection program 110a, 110b may proceed with each tabular structure consecutively based on various previously indicated factors (e.g., chronologically, based on size (smallest to largest number of cells, largest to smallest number of cells, or number of bytes associated with each tabular structure), based on user preferences (depending on whether the user indicated an order of tabular structure that the semantic header detection program 110a, 110b may proceed)).

Continuing with the previous example, while reviewing multiple documents, the external engine identifies the following two tables, Table 1 (i.e., Medications Table) and Table 2 (i.e., Animals Table):

TABLE 1

MEDICATIONS TABLE

| Coverage | Penicillins | Cephalosporin | Quinolones |
|---|---|---|---|
| Strep Pneumonia | Amoxicillin | Cefuroxime | Moxifloxacin |
| *Pseudomonas* | Piperacillin Tazobactam | Ceftazidime | Levofloxacin |
| *E. Coli* | Amoxicillin Calvulanate | Cephalexin | Ciprofloxacin |

TABLE 2

ANIMALS TABLE

| Lion | Basenji | Springbok | Black Mamba | Africa |
|---|---|---|---|---|
| Tiger | Shitzu | Blackbuck | King Cobra | Asia |
| Lynx | German Shepherd | Reindeer | Pit Viper | Europe |
| Felines | Canines | Antelopes | Serpents | Region |

The semantic header detection program 110a, 110b may automatically identify the above Table 1 and Table 2, and transmit both Tables 1 and 2 as input into the semantic header detection program 110a, 110b, and proceed consecutively with Table 1 and Table 2 in chronologically order.

In another embodiment, the tabular structure may be identified at 204 before the custom pre-trained embeddings model is received at 202. As such, once the semantic header detection program 110a, 110b determines that the tabular structure was identified, then the semantic header detection program 110a, 110b may automatically load the custom pre-trained embeddings model based on previously received custom pre-trained embeddings model.

In another embodiment, the semantic header detection program 110a, 110b may simultaneously receive the custom pre-trained embeddings model at 202, as the semantic header detection program 110a, 110b identifies a tabular structure at 204.

In another embodiment, when multiple (e.g., more than two tabular structures) are identified by the external engine, the semantic header detection program 110a, 110b may simultaneously proceed with each tabular structure simultaneously.

Next, at 206, a dot product value is computed. The semantic header detection program 110a, 110b may compute the semantic similarity feature value (i.e., similarity feature value) between the cell contents in the table to identify which table attributes (e.g., rows and/or columns) includes the header cells by determining the dot product values.

To compute the dot product values, the semantic header detection program 110a, 110b may iterate through, or iteratively process, the table attribute-by-table attribute (e.g., row-by-row or column-by-column), and may further iterate through, or iteratively process, each table attribute (e.g., row or column) cell-by-cell. In at least one embodiment, prior to computing the semantic similarity feature value, the user, or administrator, may configure the settings to select which table attribute (e.g., a row-by-row basis, or a column-by-column basis) that the semantic header detection program 110a, 110b may be first analyzed to extrapolate the contents of the individual cells.

In each iteration, the semantic header detection program 110a, 110b may retrieve the entire table attribute (e.g., row or column) and may split (i.e., categorize) the cells into two separate buckets. The semantic header detection program 110a, 110b may populate a first bucket (e.g., b1) with the cursor word and/or entity vector (i.e., current word vector), and may populate a second bucket (i.e., b2) with the remaining words and/or entity vectors from the selected table attribute. Then, the semantic header detection program 110a, 110b may add the vectors in the second bucket, and then may divide the total second bucket vectors by the number of elements in the second bucket. The number of vectors may include the number of cells. For example, the semantic header detection program 110a, 110b may utilize the following pseudo code:

```
def compute_similarity(b1, b2):
    b2_prime = add all the vectors in b2 and divide by the # of elements
    in b2
    return dot_product(b1, b2_prime)
def preprocess_text(cell):
    return cell.lower( ).strip( ).replace(" ", "_")
```

The semantic header detection program 110a, 110b may then compute the dot product values of the resultant vectors in the first and second buckets. The dot product values of the two vectors, $a=[a_1, a_2, \ldots, a_n]$ and $b=[b_1, b_2, \ldots, b_n]$ may be defined as:

$$a \cdot b = \sum_{i=1}^{n} a_i b_i = a_1 b_1 + a_2 b_2 + \ldots + a_n b_n$$

where Σ denotes summation and n is the dimension of the vector space.

In at least one embodiment, the semantic header detection program 110a, 110b may utilize one or more libraries available in various programming languages to compute the dot products values.

Then, the semantic header detection program 110a, 110b may sum the computed dot product values in the same plane of table attributes (e.g., horizontally for columns, or vertically for rows), and may divide the number of cells in the table attributes.

In at least one embodiment, if the one or more dot product values is represented in numerical values, then the semantic header detection program 110a, 110b may analyze the computed dot product values in which the header table attributes (e.g., header rows, header columns) generate the lowest dot product values (or similarity feature value) to the other table attributes, without having to normalize the dot product values. As such, the cells with contents that include similar feature values, may generate higher dot product values.

Continuing with the previous example, the semantic header detection program 110a, 110b implements the following code:

```
def semantic_similarity (df, axis=0):
    text_map_df = df.applymap(preprocess_text)
    iaxis = 1 if axis == 0 else 0
    total = text_map_df.apply(semantic_similarity_helper,
      axis=iaxis).sum(axis=axis)
    return np.divide(total, df.count(axis=axis), dtype='double')
```

-continued

```
def semantic_similarity_helper(df):
    rowcol = list(df.replace(to_replace="", value="#####"))
    sim = [ ]
    for i in rowcol:
        rc_cp = list(rowcol)
        rc_cp.remove(i)
        sim.append(compute_similarity([i], rc_cp))
    return sim
```

The semantic header detection program 110a, 110b analyze Table 1: Medications Table and compute the dot product values based on a column-by-column basis, and a row-by-row basis to determine the headers for Table 1: Medications Table. The table attribute-by-table attributes for Table 1: Medications Table is as follows:

TABLE 1

(Column-By-Column Basis)

Column 0: a = $[a_1, a_2]$ and b = $[b_1, b_2]$

Coverage
Strep Pneumonia
*Pseudomonas*
E. Coli

Column 1: a = $[a_3, a_4]$ and b = $[b_3, b_4]$

Penicillins
Amoxicillin
Piperacillin Tazobactam
Amoxicillin Calvulanate

Column 2: a = $[a_5, a_6]$ and b = $[b_5, b_6]$

Cephalosporin
Cefuroxime
Ceftazidime
Cephalexin

Column 3: a = $[a_7, a_8]$ and b = $[b_7, b_8]$

Quinolones
Moxifloxacin
Levofloxacin
Ciprofloxacin

TABLE 1

(Row-by-Row Basis)

| Row 0: a = $[a_9, a_{10}]$ and b = $[b_9, b_{10}]$ | | | |
|---|---|---|---|
| Coverage | Penicillins | Cephalosporin | Quinolones |
| Row 1: a = $[a_{11}, a_{12}]$ and b = $[b_{11}, b_{12}]$ | | | |
| Strep Pneumonia | Amoxicillin | Cefuroxime | Moxifloxacin |
| Row 2: a = $[a_{13}, a_{14}]$ and b = $[b_{13}, b_{14}]$ | | | |
| *Pseudomonas* | Piperacillin Tazobactam | Ceftazidime | Levofloxacin |
| Row 3: a = $[a_{15}, a_{16}]$ and b = $[b_{15}, b_{16}]$ | | | |
| E. Coli | Amoxicillin Calvulanate | Cephalexin | Ciprofloxacin |

The semantic header detection program 110a, 110b analyze Table 2: Animals Table and compute the dot product values based on a column-by-column basis, and a row-by-row basis to determine the headers for Table 2: Animals Table. The table attribute-by-table attributes for Table 2: Animals Table is as follows:

TABLE 2

(Column-By-Column Basis)

Column 0: a = $[a_{17}, a_{18}]$ and b = $[b_{17}, b_{18}]$

Lion
Tiger
Lynx
Felines

Column 1: a = $[a_{19}, a_{20}]$ and b = $[b_{19}, b_{20}]$

Basenji
Shitzu
German Shepherd
Canines

Column 2: a = $[a_{21}, a_{22}]$ and b = $[b_{21}, b_{22}]$

Springbok
Blackbuk
Reindeer
Antelopes

Column 3: a = $[a_{23}, a_{24}]$ and b = $[b_{23}, b_{24}]$

Black Mamba
King Cobra
Pit Viper
Serpents

Column 4: a = $[a_{25}, a_{26}]$ and b = $[b_{25}, b_{26}]$

Africa
Asia
Europe
Region

TABLE 2

(Row-By-Row Basis)

| Row 0: a = $[a_{27}, a_{28}]$ and b = $[b_{27}, b_{28}]$ | | | | |
|---|---|---|---|---|
| Lion | Basenji | Springbok | Black Mamba | Africa |
| Row 1: a = $[a_{29}, a_{30}]$ and b = $[b_{29}, b_{30}]$ | | | | |
| Tiger | Shitzu | Blackbuk | King Cobra | Asia |
| Row 2: a = $[a_{31}, a_{32}]$ and b = $[b_{31}, b_{32}]$ | | | | |
| Lynx | German Shepherd | Reindeer | Pit Viper | Europe |
| Row 3: a = $[a_{33}, a_{34}]$ and b = $[b_{33}, b_{34}]$ | | | | |
| Felines | Canines | Antelopes | Serpents | Region |

Then, at 208, the dot product value is normalized. The semantic header detection program 110a, 110b may utilize an external engine (e.g., MinMax Scaler) to normalize (or structure) the dot product values (e.g., changing dot product values into numerical values, or changing the dot product values into a binary form in which 0 represents false and 1 represents true). The external engine may then sort or rank the dot product values from highest to lowest, or lowest to highest, without eliminating outliers and/or inconsistent dot product values.

In at least one embodiment, the external engine may transform the normalized dot product values into a valid input for a machine learning (ML) model unsupervised or supervised.

In at least one embodiment, the semantic header detection program 110a, 110b may utilize an external engine to cleanse the one or more dot product values to eliminate any outliers, or inconsistent dot product values. As such, any outliers and inconsistent dot product values may excluded from the analysis on determining the header of the tabular structure.

Continuing with the previous example, the semantic header detection program 110a, 110b utilize an external engine to normalize the dot product values by sorting the dot product values in highest to lowest as follows:

TABLE 1

Medications Table

Based on Columns:

Column 1: 100.0000
Column 3: 95.720322
Column 2: 93.827179
Column 0: 0.0000

Based on Rows:

Row 2: 100.0000
Row 3: 70.302581
Row 1: 50.812870
Row 0: 0.0000

TABLE 2

Animals Table

Based on Columns:

Column 2: 100.0000
Column 0: 96.974429
Column 3: 92.078003
Column 1: 84.957345
Column 4: 0.0000

Based on Rows:

Row 1: 100.0000
Row 0: 75.360480
Row 2: 65.487428
Row 3: 0.00000

Then, at 210, the semantic header is detected. The semantic header detection program 110a, 110b may then analyze the normalized dot product values in which the header table attributes (e.g., header rows, header columns) generate the lowest dot product values (or similarity feature value) to the other table attributes. The cells with contents that include similar feature values, may generate higher dot product values. Therefore, the semantic header detection program 110a, 110b may detect the semantic header based on the generated lower dot product values.

In at least one embodiment, the semantic header may include either a row or a column associated with the tabular structure. In some other embodiments, the semantic header may include multiple (two or more) columns and/or rows associated with the tabular structure depending on the normalized and ranked (i.e., sorted) dot product values generated by the semantic header detection program 110a, 110b.

Continuing with the previous example, the semantic header detection program 110a, 110b analyzes the normalized dot product values sorted from highest to lowest dot product values in which the lowest dot product values has the least similar feature values. The semantic header detection program 110a, 110b then determines that the column and row with the least similar feature values for each table is the header row and column.

For Table 1: Medications Table, the semantic header detection program 110a, 110b determines that Column 0 and Row 0, each with 0.0000 normalized dot product values, have the least similarity feature values compared to the other columns and rows. Therefore, the semantic header detection program 110a, 110b determines that Column 0 is the header column, and Row 0 is the header row.

For Table 2: Animals Table, the semantic header detection program 110a, 110b determines that Column 4 and Row 3, each with 0.0000 normalized dot product values, have the least similarity features values compared to the other columns and rows. Therefore, the semantic header detection program 110a, 110b determines that Column 4 is the header column, and Row 3 is the header row.

In the present embodiment, the semantic header detection program 110a, 110b may combine the similarity feature values in a larger feature set (e.g., training data) as input into a machine learning (ML) classifier for training purposes to improve the predictions of the ML classifier. As such, the header detection ML classifier may utilize multiple features (e.g., semantic similarity) to classify the contents of the cells. The tabular structures may be further utilized to test against other tabular structures with similar features. In at least one other embodiment, the similarity feature values may be fed into a clustering model that identifies groups of similar records and labeling the tabular structures based on the records according to the group to which the records that the similarity feature values belong. The labeled tabular structures may be stored in a database associated with the clustering model may be stored to improve the predictions of the ML clustering algorithm and/or model. In some embodiments, the semantic header detection program 110a, 110b may utilize the similarity feature values from the similarity feature values in a heuristics-based header detection method. For example, a threshold may be defined for the heuristics models and any normalized scores for a row and/or column that fall below the threshold may be identified the row and/or column as a header.

The semantic header detection program 110a, 110b may improve the functionality of the computer, the technology and/or the field of technology by utilizing pre-trained word embeddings to provide a semantic understanding to computers to enable them to differentiate headers as opposed to data without having to rely on syntactical features (e.g., position of the cells in the tables, number of numeric or symbolic characters, font-style of the cells).

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
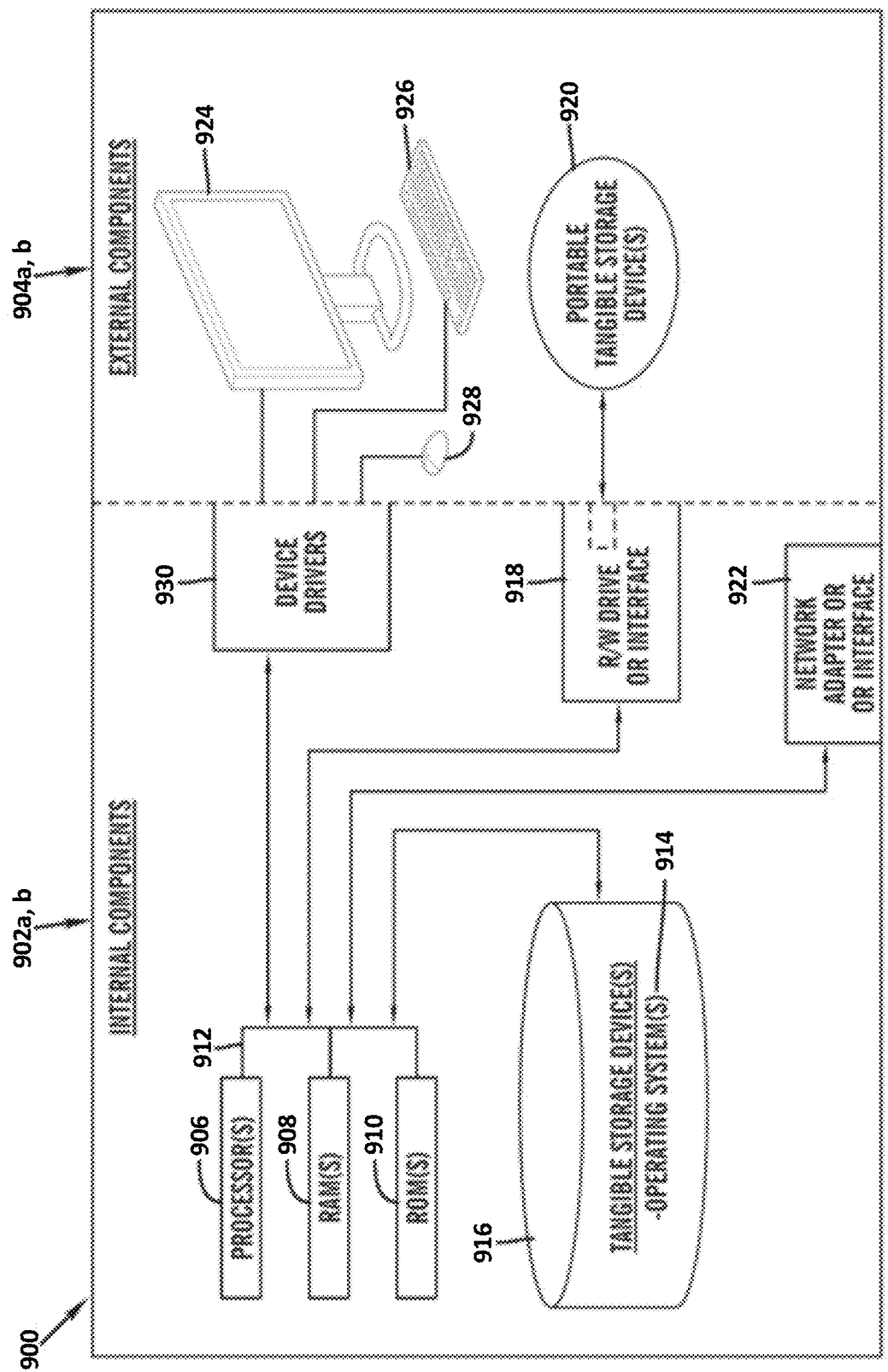
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the semantic header detection program 110a in client computer 102, and the semantic header detection program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the semantic header detection program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the semantic header detection program 110a in client computer 102 and the semantic header detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the semantic header detection program 110a in client computer 102 and the semantic header detection program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices.

Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
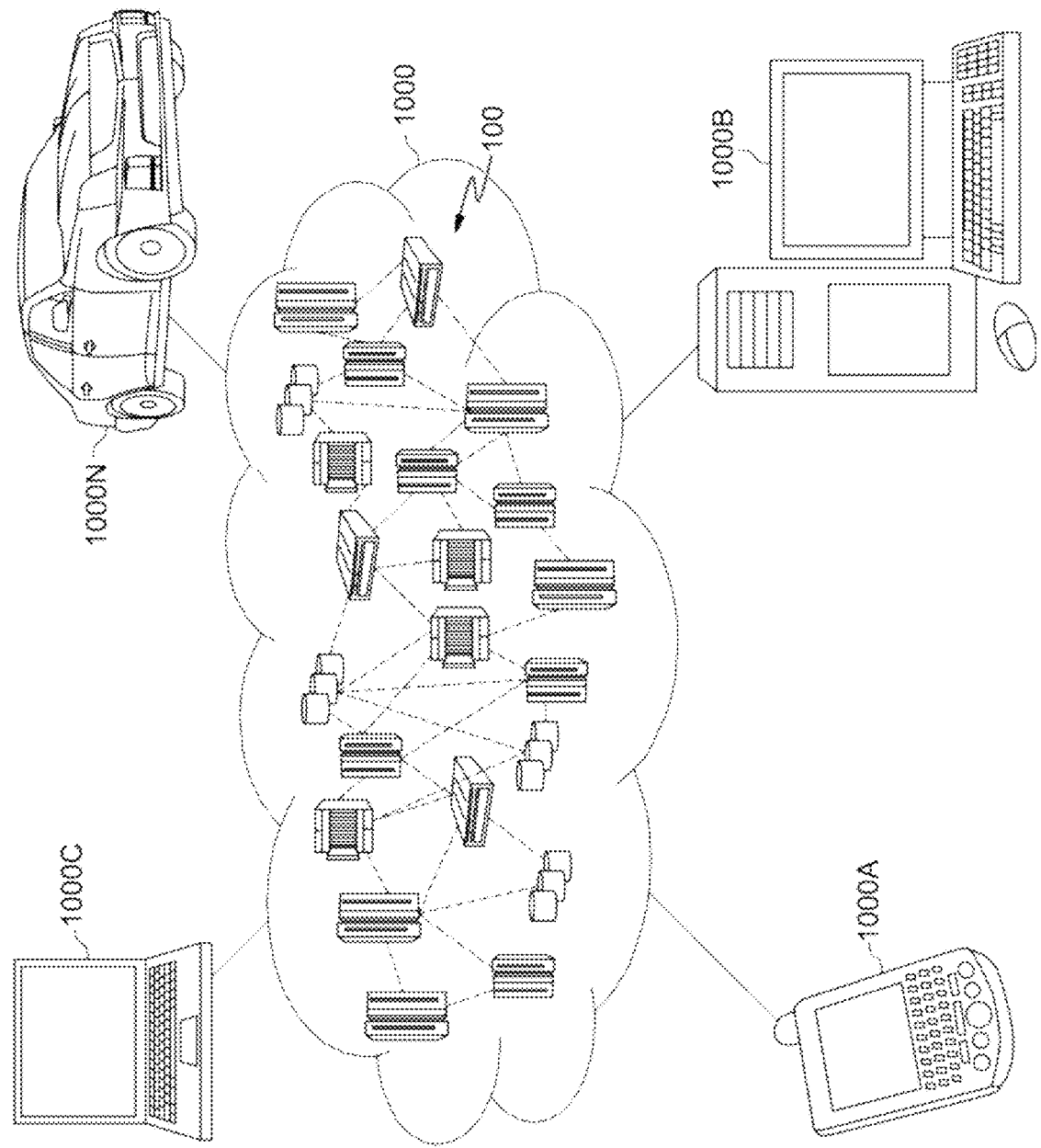
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
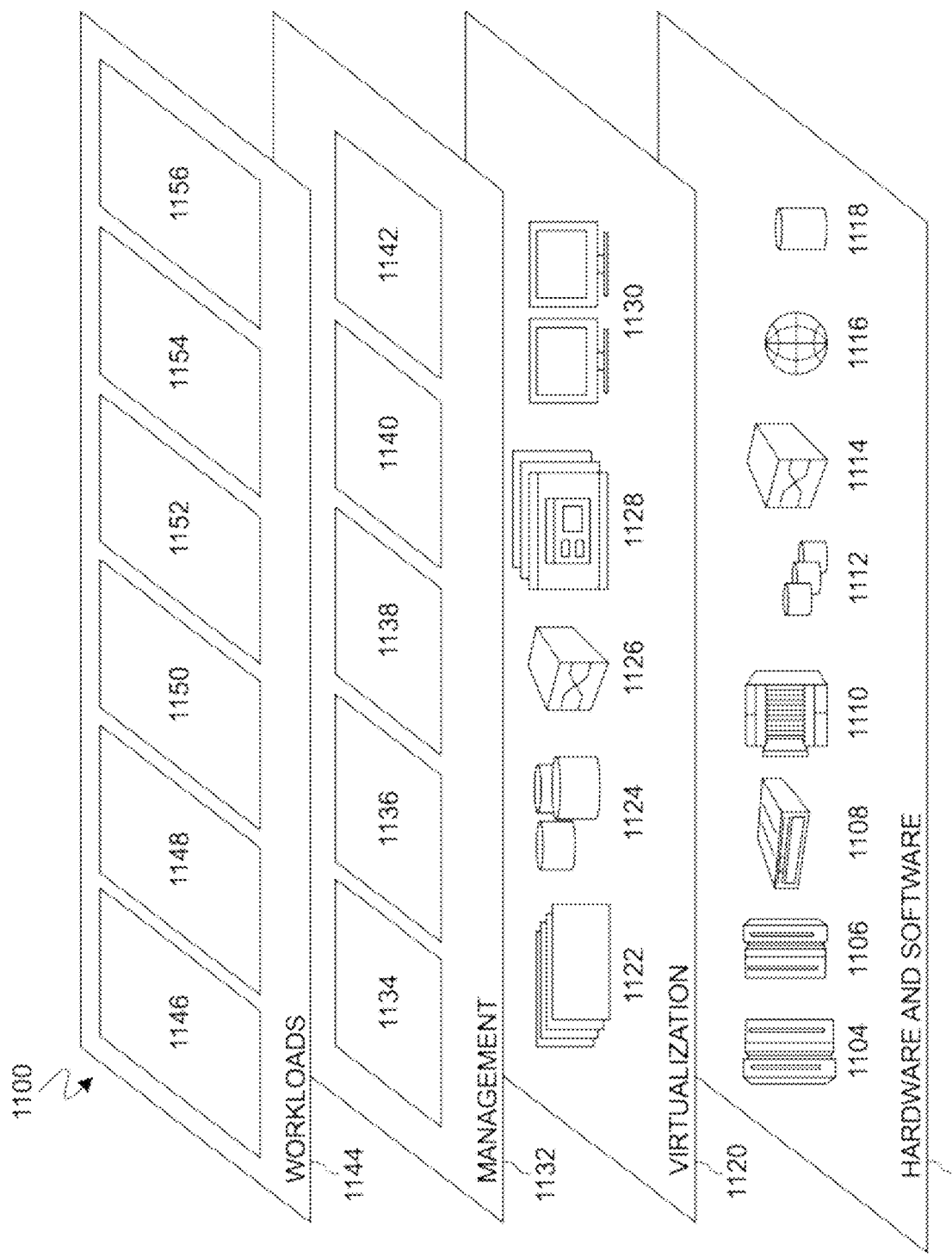
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and semantic header detection 1156. A semantic header detection program 110a, 110b provides a way to detect at least one header in at least one tabular structure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving a custom pre-trained embeddings model,
wherein the received custom pre-trained embeddings model provides a context associated with each term included in each cell from a plurality of cells associated with one or more tabular structures in one or more documents;

computing one or more dot product values associated with the one or more tabular structures from the one or more documents based on the context of each cell from the plurality of cells associated with the one or more tabular structures in the one or more documents,
wherein the one or more tabular structures in the one or more documents is identified by parsing the one or more documents;

analyzing a plurality of cell contents in each table attribute associated with the one or more tabular structures;

dividing each cell from the plurality of cells in each tabular structure into two or more buckets,
wherein a first bucket is populated with a current word vector associated with each cell, and
wherein a second bucket is populated with one or more remaining word vectors associated with each cell;

generating one or more similarity feature values based on the computed one or more dot product values,
wherein the computed one or more dot product values are normalized; and detecting one or more semantic headers associated with the one or more tabular structures from the one or more documents based on the one or more similarity feature values.

2. The method of claim 1, further comprising:

adding the one or more remaining word vectors associated with each cell in each tabular structure on a table attribute-by-table attribute basis to compute a total second bucket vector; and dividing the computed total second bucket vector with a number of cells.

3. The method of claim 2, further comprising:

computing the one or more dot product values from the populated first bucket and the populated second bucket; and computing a sum of the dot product values based on the plurality of cells in a same plane of the table attributes in each tabular structure to compute the one or more dot product values for each of the table attributes in each tabular structure.

4. The method of claim 1, wherein generating the one or more similarity feature values based on the computed one or more dot product values, wherein the computed one or more dot product values are normalized, further comprises:

sorting the computed one or more dot product values based on a numerical value associated with each computed dot product value from the computed one or more dot product values; and in response to determining a lowest dot product value, designating the table attribute associated with the lowest dot product value as the header associated with the tabular structure.

5. The method of claim 1, further comprising:

combining the generated one or more similarity feature values associated with the one or more tabular structures;

transmitting, to a machine learning (ML) classifier, the combined one or more similarity feature values associated with the one or more tabular structures; and classifying a plurality of contents associated with a plurality of cells from the one or more tabular structures.

6. The method of claim 1, further comprising:

identifying one or more groups of similar records in a clustering model based on the generated one or more similarity feature values;

labeling the one or more tabular structures based on the identified one or more groups of similar records; and storing the labeled one or more tabular structures in the clustering model, wherein the clustering model includes a database.

7. A computer system for detecting one or more semantic headers in one or more tabular structures by utilizing a custom pre-trained embeddings model, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving the custom pre-trained embeddings model,
wherein the received custom pre-trained embeddings model provides a context associated with each term included in each cell from a plurality of cells associated with the one or more tabular structures in one or more documents;

computing one or more dot product values associated with the one or more tabular structures from the one or more documents based on the context of each cell from the plurality of cells associated with the one or more tabular structures in the one or more documents,
wherein the one or more tabular structures in the one or more documents is identified by parsing the one or more documents;

analyzing a plurality of cell contents in each table attribute associated with the one or more tabular structures;

dividing each cell from the plurality of cells in each tabular structure into two or more buckets,
wherein a first bucket is populated with a current word vector associated with each cell, and
wherein a second bucket is populated with one or more remaining word vectors associated with each cell;

generating one or more similarity feature values based on the computed one or more dot product values,
wherein the computed one or more dot product values are normalized; and detecting the one or more semantic headers associated with the one or more tabular structures from the one or more documents based on the one or more similarity feature values.

8. The computer system of claim 7, further comprising:

adding the one or more remaining word vectors associated with each cell in each tabular structure on a table attribute-by-table attribute basis to compute a total second bucket vector; and dividing the computed total second bucket vector with a number of cells.

9. The computer system of claim 8, further comprising:

computing one or more dot product values from the populated first bucket and the populated second bucket; and computing a sum of the dot product values based on the plurality of cells in a same plane of the table attributes in each tabular structure to compute the one or more dot product values for each of the table attributes in each tabular structure.

10. The computer system of claim 7, wherein generating the one or more similarity feature values based on the computed one or more dot product values, wherein the computed one or more dot product values are normalized, further comprises:
sorting the computed one or more dot product values based on a numerical value associated with each computed dot product value from the computed one or more dot product values; and
in response to determining a lowest dot product value, designating the table attribute associated with the lowest dot product value as the header associated with the tabular structure.

11. The computer system of claim 7, further comprising:
combining the generated one or more similarity feature values associated with the one or more tabular structures;
transmitting, to a machine learning (ML) classifier, the combined one or more similarity feature values associated with the one or more tabular structures; and
classifying a plurality of contents associated with a plurality of cells from the one or more tabular structures.

12. The computer system of claim 7, further comprising:
identifying one or more groups of similar records in a clustering model based on the generated one or more similarity feature values;
labeling the one or more tabular structures based on the identified one or more groups of similar records; and
storing the labeled one or more tabular structures in the clustering model, wherein the clustering model includes a database.

13. A computer program product for detecting one or more semantic headers in one or more tabular structures by utilizing a custom pre-trained embeddings model, comprising:
one or more computer-readable storage media and program instructions stored on at least one of the one or more tangible storage media, the program instructions executable by a processor to cause the processor to perform a method comprising:
receiving the custom pre-trained embeddings model, wherein the received custom pre-trained embeddings model provides a context associated with each term included in each cell from a plurality of cells associated with the one or more tabular structures in one or more documents;
computing one or more dot product values associated with the one or more tabular structures from the one or more documents based on the context of each cell from the plurality of cells associated with the one or more tabular structures in the one or more documents,
wherein the one or more tabular structures in the one or more documents is identified by parsing the one or more documents;
analyzing a plurality of cell contents in each table attribute associated with the one or more tabular structures;
dividing each cell from the plurality of cells in each tabular structure into two or more buckets,
wherein a first bucket is populated with a current word vector associated with each cell, and
wherein a second bucket is populated with one or more remaining word vectors associated with each cell;
generating one or more similarity feature values based on the computed one or more dot product values,
wherein the computed one or more dot product values are normalized; and
detecting the one or more semantic headers associated with the one or more tabular structures from the one or more documents based on the one or more similarity feature values.

14. The computer program product of claim 13, further comprising:
adding the one or more remaining word vectors associated with each cell in each tabular structure on a table attribute-by-table attribute basis to compute a total second bucket vector; and
dividing the computed total second bucket vector with a number of cells.

15. The computer program product of claim 14, further comprising:
computing one or more dot product values from the populated first bucket and the populated second bucket; and
computing a sum of the dot product values based on the plurality of cells in a same plane of the table attributes in each tabular structure to compute the one or more dot product values for each of the table attributes in each tabular structure.

16. The computer program product of claim 13, wherein generating the one or more similarity feature values based on the computed one or more dot product values, wherein the computed one or more dot product values are normalized; further comprises:
sorting the computed one or more dot product values based on a numerical value associated with each computed dot product value from the computed one or more dot product values; and
in response to determining a lowest dot product value, designating the table attribute associated with the lowest dot product value as the header associated with the tabular structure.

17. The computer program product of claim 13, further comprising:
combining the generated one or more similarity feature values associated with the one or more tabular structures;
transmitting, to a machine learning (ML) classifier, the combined one or more similarity feature values associated with the one or more tabular structures; and
classifying a plurality of contents associated with a plurality of cells associated with the combined one or more similarity feature values from the one or more tabular structures.

* * * * *